Patented June 26, 1934

1,963,975

UNITED STATES PATENT OFFICE 1,963,975

PRODUCTION OF WATERPROOF MATERIALS

George Holland Ellis, Spondon, near Derby, England, assignor to Celanese Corporation of America, a corporation of Delaware No Drawing. Application July 16, 1929, Serial No. 378,821. In Great Britain August 7, 1928

15 Claims. (Cl. 91—68)

This invention relates to the waterproofing of materials made of or containing organic derivatives of cellulose, for example cellulose acetate, cellulose formate, propionate or butyrate, "immunized cotton" or other cellulose esters or methyl, ethyl or benzyl cellulose or other cellulose ethers, or mixed materials containing one or more of these fibres.

According to the present invention materials made of or containing organic derivatives of cellulose are waterproofed by treatment with an emulsion of wax in a soap and by precipitation of the soap in or on the material under treatment.

The term soap is employed broadly and embraces in addition to the customary salts of fatty acids, salts of sulphonated fatty acids or oils, resins, naphthenic acids and the like, and further includes the free acids themselves where these are capable of emulsifying the wax. The precipitation of the soap in or on the material may be carried out by any suitable treatment with a compound of a metal capable of forming an insoluble soap, for example with a compound of tin, aluminium, calcium, barium, lead, iron, chromium, bismuth, zinc, antimony and the like. The metal compounds may be applied to the materials in the form of soluble salts, for example chlorides, sulphates, thiocyanates and the like.

In addition to rendering the materials more impervious to water the treatment according to the present invention may result, according to the nature of the materials treated and to the conditions of treatment, in a subduing of the lustre.

The treatment of the materials with the emulsified wax on the one hand and with the metal compound on the other may take place in any order.

Good results are obtainable whether the metallic compound be applied before or after the wax emulsions. Cellulose ester and ether materials do not readily absorb the metallic radicals from solution and in consequence the treatment with metallic compounds is applied under such conditions that swelling of the cellulose derivative occurs, for example, as described in U. S. application No. 374,288, filed June 27, 1929, or alternatively, as described in that specification, the metallic radicles may be incorporated in the spinning solutions used for the manufacture of the filaments etc. As in the said application a solution of a soluble metallic compound may either be applied at such concentrations or under such conditions as to cause a swelling of the cellulose derivatives or it may be applied in conjunction with or after the treatment of the material with a swelling agent. Furthermore, if desirable, a treatment of the material with a swelling agent may precede the treatment with the metallic compound even though the latter swells the material or is used in conjunction with a swelling agent therefor.

Thiocyanates themselves have a swelling action upon the cellulose derivatives and do not require the presence or use of a separate swelling agent. The chlorides in comparatively concentrated solutions also swell cellulose derivatives but swelling agents may be added to their solutions or may be applied to the materials before their use. Suitable swelling agents, particularly in aqueous solution, are acetic acid, formic acid, glycollic acid or lactic acid; ethyl alcohol, acetone, diacetone alcohol or diacetin; phenol, hydroquinone or other water soluble phenols or polyhydric phenols, thiocyanates or cyanates and urea, urethanes, thiourea, thiourethanes, guanidine or alkyl or other simple derivatives thereof. Such swelling agents may be added to the solutions of the metallic compounds or they may be used for producing a swelling of the cellulose derivatives before treatment with the solutions of the metallic compounds.

Any suitable waxes may be employed for the purpose of the present invention, for example japan wax, carnauba wax, Ozokerite, beeswax and the like, all included in the term "natural wax". Emulsions thereof may be prepared by any suitable means, such means being well known in the colloid arts.

The present invention further contemplates the production of coloured water proofed materials by colouring the goods at any suitable stage in their manufacture. Materials other than cellulose derivatives are preferably coloured before waterproofing. Materials comprising cellulose derivatives may be coloured before or after waterproofing, or, if desired, dyestuffs may be incorporated in the wax emulsions themselves if soluble therein so as to colour and waterproof the material in one operation.

After waterproofing according to the present invention the goods may be subjected to any desired finishing or making up processes.

The following examples illustrate the invention but are not to be regarded as limiting it in any way:—

*Example 1*

An emulsion is made up consisting of 5 grams of japan wax, 5 grams of soap flakes, and 30 ccs. of ammonia (sp. gr. .880) per litre of liquor. Cellulose acetate fabric is entered into this solution at 45° C. and steeped for 15 minutes. It is then lifted, squeezed evenly, and entered into a solution of aluminium acetate standing at 5° Tw. and worked for 10 minutes at 20° C. The goods are now lifted, rinsed and dried or otherwise treated as requisite.

*Example 2*

Cellulose acetate fabric is padded at 30° C. in a solution of tin chloro thiocyanate prepared by dissolving 3 parts of stannic chloride and 1 part of ammonium thiocyanate in the least quantity of water and diluting to 42° Tw. The goods are now batched for 3 hours at 30° C. and then, without rinsing, treated for 15 minutes at 45° C. in an emulsion of 5 grams of carnauba wax and 5 grams of soap flakes per litre of liquor. The fabric is now washed till free from thiocyanate, and dried or otherwise treated as requisite.

Treated as above the fabric acquires a subdued lustre, which may be modified to a greater degree by raising the temperature of the soap bath.

What I claim and desire to secure by Letters Patent is:—

1. Textile material comprising an organic derivative of cellulose having deposited therein a wax and an insoluble tin soap.

2. Textile material comprising cellulose acetate having deposited therein a natural wax and an insoluble metallic soap.

3. Materials comprising cellulose acetate having deposited therein a wax and an insoluble tin soap.

4. Waterproofed textile materials comprising an organic derivative of cellulose having deposited therein a wax and an insoluble metallic soap.

5. Process for the production of waterproofed materials, comprising treating materials comprising an organic derivative of cellulose with an emulsion of wax in soap solution and precipitating the soap in the form of an insoluble metallic soap in the material, the water-proofing being rendered effective by applying the metallic radicle while the cellulose derivative is in a swollen condition.

6. Process for the production of waterproofed materials, comprising treating materials comprising cellulose acetate with an emulsion of wax in soap solution and precipitating the soap in the form of an insoluble metallic soap in the material, the waterproofing being rendered effective by applying the metallic radicle while the cellulose acetate is in a swollen condition.

7. Process for the production of waterproofed textile materials, comprising incorporating a metallic compound in textile materials comprising an organic derivative of cellulose and then treating with an emulsion of wax in soap solution, the waterproofing being rendered effective by incorporating the metallic radicle while the cellulose derivative is in a swollen condition.

8. Process for the production of waterpoofed textile materials, comprising incorporating a metallic compound in textile materials comprising cellulose acetate and then treating with an emulsion of wax in soap solution, the waterproofing being rendered effective by incorporating the metallic radicle while the cellulose acetate is in a swollen condition.

9. Process for the production of waterproofed materials according to claim 7, wherein the metallic compound is incorporated in the spinning solution itself used in the manufacture of the materials.

10. Process for the production of waterproofed materials according to claim 8, wherein the metallic compound is incorporated in the spinning solution itself used in the manufacture of the materials.

11. Process for the production of waterproofed materials, comprising treating materials comprising an organic derivative of cellulose with an emulsion of wax and a coloring matter in soap solution and precipitating the soap in the form of an insoluble metallic soap in the material, the waterproofing being rendered effective by applying the metallic radicle while the cellulose derivative is in a swollen condition.

12. Process for the production of waterproofed materials, comprising treating materials comprising cellulose acetate with an emulsion of wax and a coloring matter in soap solution and precipitating the soap in the form of an insoluble metallic soap in the material, the waterproofing being rendered effective by applying the metallic radicle while the cellulose derivative is in a swollen condition.

13. Process for the production of waterproofed materials, comprising treating cellulose acetate materials with an emulsion of wax in soap solution and precipitating the soap in the form of an insoluble tin soap in the material, the waterproofing being rendered effective by applying the tin radicle while the cellulose acetate is in a swollen condition.

14. Process for the production of waterproofed materials comprising incorporating a tin salt in materials comprising cellulose acetate and then treating with an emulsion of wax in soap solution and precipitating the soap in the form of an insoluble tin soap in the material, the waterproofing being rendered effective by incorporating the tin radicle while the cellulose acetate is in a swollen condition.

15. Process for the production of waterproofed materials according to claim 14, wherein the tin salt is incorporated in the spinning solution used in the manufacture of the cellulose acetate material.

GEORGE HOLLAND ELLIS.